(12) United States Patent
Tripathi et al.

(10) Patent No.: US 9,497,464 B2
(45) Date of Patent: *Nov. 15, 2016

(54) GOP-INDEPENDENT DYNAMIC BIT-RATE CONTROLLER

(71) Applicants: STMICROELECTRONICS INTERNATIONAL N.V., Amsterdam OT (NL); STMICROELECTRONICS S.R.L., Agrate Brianza (IT)

(72) Inventors: Subarna Tripathi, Greater Noida (IN); Emiliano Piccinelli, Agrate Brianza (IT)

(73) Assignees: STMICROELECTRONICS INTERNATIONAL N.V., Amsterdam (NL); STMICROELECTRONICS S.R.L., Agrate Brianza (MB) (IT)

( * ) Notice: Subject to any disclaimer, the term of this patent is extended or adjusted under 35 U.S.C. 154(b) by 215 days.

This patent is subject to a terminal disclaimer.

(21) Appl. No.: 13/827,210

(22) Filed: Mar. 14, 2013

(65) Prior Publication Data

US 2013/0202031 A1 Aug. 8, 2013

Related U.S. Application Data

(63) Continuation of application No. 12/819,604, filed on Jun. 21, 2010, now Pat. No. 8,913,658.

(30) Foreign Application Priority Data

Jun. 25, 2009 (IT) .............................. TO2009A0486

(51) Int. Cl.
*H04N 7/12* (2006.01)
*H04N 19/107* (2014.01)
*H04N 19/149* (2014.01)
(Continued)

(52) U.S. Cl.
CPC .......... *H04N 19/107* (2014.11); *H04N 19/105* (2014.11); *H04N 19/124* (2014.11);
(Continued)

(58) Field of Classification Search
CPC .......................... H04N 19/107; H04N 19/149
USPC ..................................................... 375/240.03
See application file for complete search history.

(56) References Cited

U.S. PATENT DOCUMENTS 6,535,251 B1 * 3/2003 Ribas-Corbera ... H04N 21/6377
348/405.1
6,643,327 B1 * 11/2003 Wang ............... H04N 21/23655
375/240.12

(Continued)

FOREIGN PATENT DOCUMENTS

EP 1 091 588 A1 4/2001
EP 1 096 803 A2 5/2001

(Continued)

OTHER PUBLICATIONS

IT Office Action for application No. TO2009A000486, dated Sep. 8, 2011, pp. 1.

(Continued)

*Primary Examiner* — Richard Torrente
(74) *Attorney, Agent, or Firm* — Allen, Dyer, Doppelt, Milbrath & Gilchrist, P.A.

(57) ABSTRACT

A GOP-independent dynamic bit-rate controller system includes a user interface to receive one or more input parameters, a bit-rate controller and an encoder. The bit-rate controller regulates a bit-rate of an output bit-stream. The bit-rate controller includes multiple bit-rate modules to determine a bit-estimate and a quantization parameter, and a control module to calculate a convergence period based on the received input parameters and a frame rate. The control module selects a bit rate module based on the convergence period and the encoder generates the output bit-stream using the quantization parameter determined by the bit rate module.

20 Claims, 7 Drawing Sheets

(51) Int. Cl.
*H04N 19/124* (2014.01)
*H04N 19/152* (2014.01)
*H04N 19/162* (2014.01)
*H04N 19/177* (2014.01)
*H04N 19/40* (2014.01)
*H04N 19/105* (2014.01)
*H04N 19/146* (2014.01)
*H04N 19/169* (2014.01)

(52) U.S. Cl.
CPC .......... *H04N19/146* (2014.11); *H04N 19/149* (2014.11); *H04N 19/152* (2014.11); *H04N 19/162* (2014.11); *H04N 19/169* (2014.11); *H04N 19/177* (2014.11); *H04N 19/40* (2014.11)

(56) References Cited

U.S. PATENT DOCUMENTS

2003/0185299 A1* 10/2003 Takita .................. H04N 19/159
   375/240.03
2005/0084007 A1* 4/2005 Lightstone ........... H04N 19/159
   375/240.03
2009/0225193 A1* 9/2009 Ishii ......................... H04N 5/77
   348/231.99
2010/0284278 A1* 11/2010 Alanara .................. H04L 47/11
   370/235

FOREIGN PATENT DOCUMENTS

EP         1 524 860 A2    4/2005
WO         02/32141 A2     4/2002

OTHER PUBLICATIONS

IT Search report, application No. IT TO20090486, dated Feb. 16, 2010, pp. 8.

Sun, Huifang, et al., Digital Video Transcoding for Transmission and Storage, CRC Press, pp. I, 232-243.

* cited by examiner

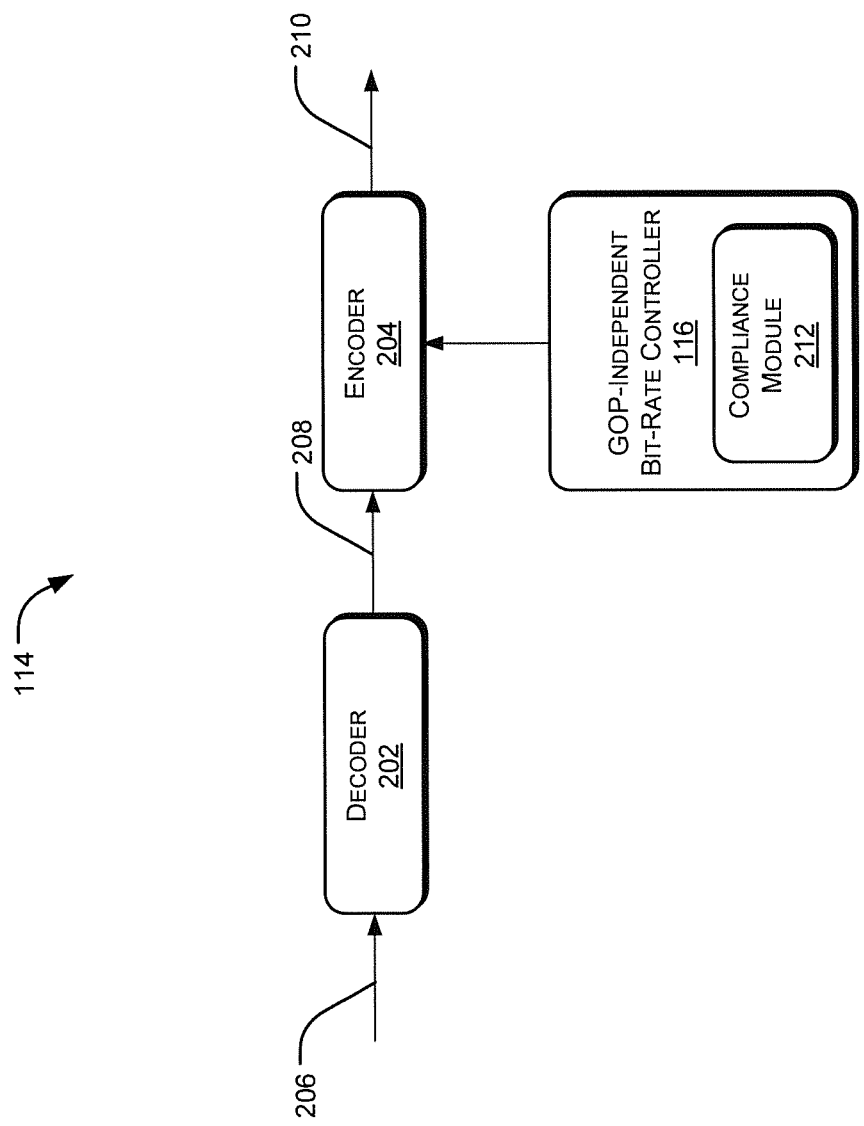

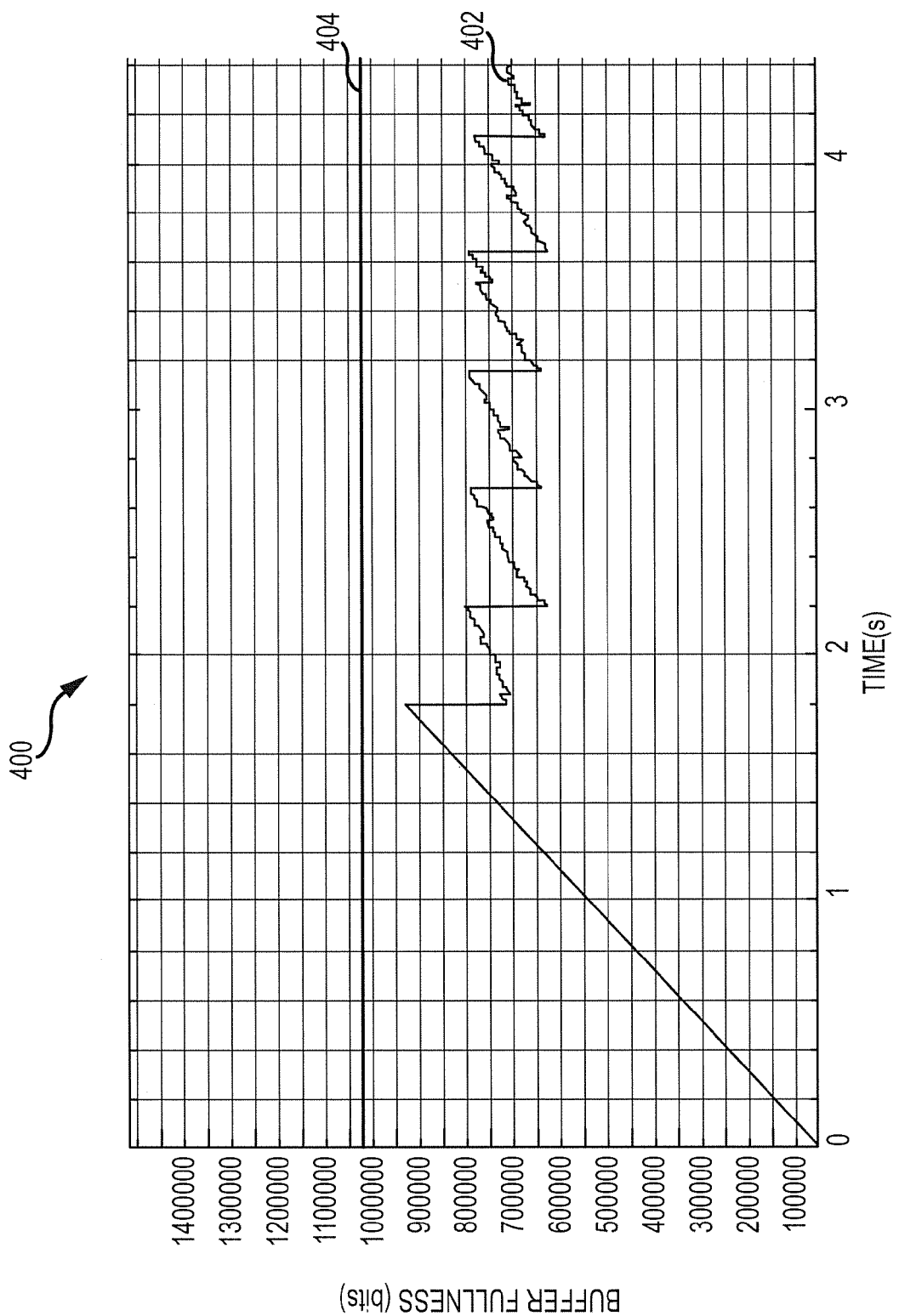

GOP-INDEPENDENT DYNAMIC BIT-RATE CONTROLLER

RELATED APPLICATION

The present invention is a continuation of U.S. patent application Ser. No. 12/819,604 filed Jun. 21, 2010, which claims the benefit of Italian Patent Application No. TO2009A000486 filed Jun. 25, 2009, both of which are incorporated herein by reference in their entireties.

FIELD OF THE INVENTION

The present invention relates to a group-of-pictures (GOP)-independent dynamic bit-rate controllers (GI-DBRC) for transcoders.

BACKGROUND

Nowadays, video sequences coded in a diversity of video coding standards such as MPEG-2, MPEG-4, H.263, and H.264, are transmitted in real time over a variety of networks, for example, wired networks, wireless networks, local area networks, etc. For this purpose, these video sequences are transcoded from one video coding standard to another based on the requirements of users, network characteristics, for example, bandwidth, and features, such as, display capabilities, buffer capacity, etc., of terminal devices used by the users.

A transcoder converts a pre-compressed bit-stream encoded in a particular video coding standard and having a specific bit-rate into another compressed bit-stream having a different bit-rate for same or different video coding standard by using bit-rate controllers. A bit-rate controller, as used within transcoders, is of prime concern in video encoding as it dynamically adjusts the transcoder parameters such that generated bit-rates from the transcoder are as close as possible to the target bit-rate. The target bit-rate is usually computed at the start of the video sequence encoding. Various bit-rate controllers have been proposed in the past to adapt the bit-rate generated by a transcoder to match the available/actual bit-rate and bandwidth of a transmission channel.

Bit-rate controllers allocate bits to different types of picture frames, namely, I-picture frames, P-picture frames, and B-picture frames, in an input video sequence to a transcoder. These picture frames, typically twelve in number, constitute a group of pictures (GOP) structure. Typically, a GOP structure starts with an I-picture frame and does not have more than one I-picture frame. In general, I-pictures require more bits than P and B-picture frames because the former does not take temporal correlation between successive pictures. Therefore, in order to have a wise use of bits distribution over the three picture types in a GOP, it is necessary to have a priori knowledge of the GOP structure of the input bit-stream. The main encoder has information regarding bits distribution and can set the quantization parameter (QP) based on the priori information. However, the transcoder does not have such knowledge and therefore, is not certain about bits distribution. A transcoder has, in essence, no control over the GOP structures of the new output bit-stream.

In conventional transcoders, existing bit-rate controllers assume or predict a particular GOP structure based on history of previous input bit-streams. However, this kind of prediction fails if the GOP structure changes dramatically or if the current GOP length is very high or very low based on past histories. Moreover, some bit-rate controllers can only provide a transcoded video coding standard in the same video coding standard as that of the input bit stream. Since the interpretation of QP is different for different standards, there is no efficient solution for a first video coding standard to a second video coding standard transcoding.

Existing solutions for bit-rate controllers work well for low-delay video transcoding but cannot be extended for B-pictures, which are very common in present day scenario. Hence, the dependency on the prediction techniques of a GOP structure as well as using these techniques in the bit-rate controllers for a conventional transcoder is error prone and inefficient.

SUMMARY

This summary is provided to introduce concepts related to a GOP-independent dynamic bit-rate controller (GI-DBRC), also referred to as bit-rate controller, which is further described below in the detailed description. This summary is not intended to identify essential features of the claimed subject matter nor is it intended for use in determining or limiting the scope of the claimed subject matter.

In one implementation, the system includes a user interface to receive one or more input parameters, a bit-rate controller and an encoder. The bit-rate controller is configured to regulate a bit-rate of an output bit-stream. In one embodiment, the bit-rate includes multiple bit-rate modules configured to determine a bit-estimate and a quantization parameter, and a control module configured to calculate a convergence period based on the received input parameters and a frame rate. Further the control module selects a bit rate module based on the convergence period and the encoder generates the output bit-stream using the quantization parameter determined by the bit rate module.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 1 (b) illustrates another exemplary system implementing a transcoder with controller GOP-independent dynamic bit-rate controller (GI-DBRC) in accordance with an embodiment of the present subject matter.

FIG. 2 illustrates an exemplary block diagram of a transcoder in accordance with an embodiment of the present subject matter.

DETAILED DESCRIPTION OF PREFERRED EMBODIMENTS

Figure 1A:
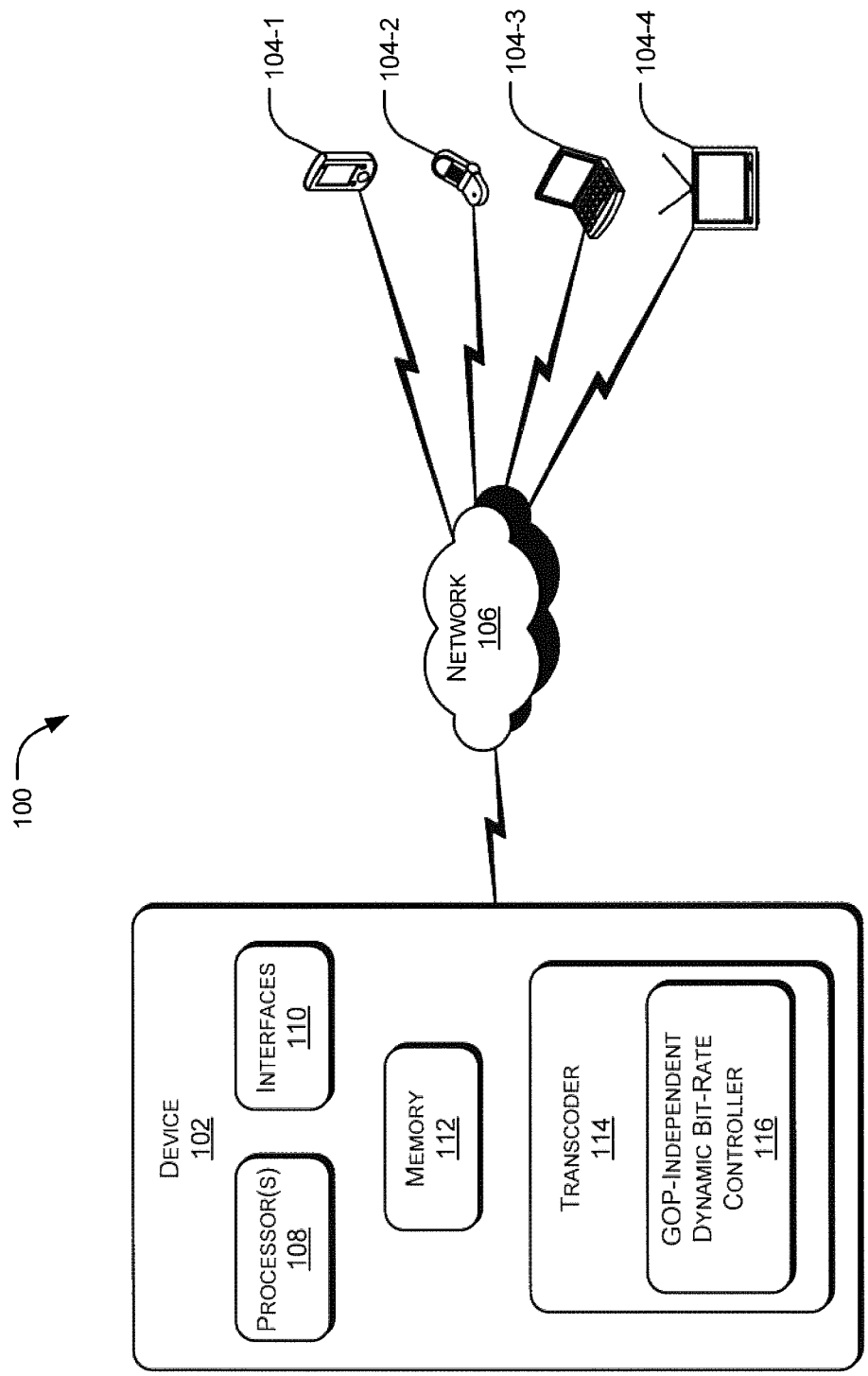
FIG. 1 (a) illustrates an exemplary system implementing a transcoder with GOP-independent dynamic bit-rate controller (GI-DBRC) in accordance with an embodiment of the present subject matter.

The disclosed subject matter relates to a group-of-pictures (GOP)-independent dynamic bit-rate controller (GI-DBRC)

for transcoders. Particularly, the subject matter relates to a system and a method for efficiently and dynamically allocating bits to different types of picture frames without the knowledge of a GOP structure of a pre-compressed input bit-stream.

In one implementation, a transcoder includes an encoder, a decoder, and a GOP-independent dynamic bit-rate controller, also interchangeably referred to as a controller hereinafter. The decoder decodes a pre-compressed input bit-stream coded in a first video coding standard. The decoded bit-stream is then encoded by the encoder to provide an output bit-stream coded in a second video coding standard. The encoder uses the controller for providing the output bit-stream at a target bit-rate. For this, in addition to the target bit-rate, other input parameters such as reaction speed, maximum and minimum instantaneous bit-rate, minimum and maximum quantization parameter can be provided by a user as input. These parameters, particularly reaction speed, and frame rate of the input bit-stream facilitate in calculation of a convergence period. By definition, the convergence period is the time expressed in the number of picture frames. The use of convergence period guarantees that the bit-rate of output bit-stream converges toward the target bit-rate within the convergence period requested by the user.

Depending on the calculated value of convergence period, a control module, included in the controller, selects the output behavior from a pure constant bit-rate (CBR) mode to a pure variable bit-rate (VBR) mode. The pure CBR mode facilitates the output bit-stream generation at a constant bit-rate whereas the pure VBR mode facilitates the output bit-stream at a constant quality, thus allowing bigger variations in the instantaneous bit-rate. Based upon the bit-rate obtained from the selected mode, a quantization parameter is generated by the controller to achieve the target bit-rate, as specified by the user.

For said implementation, when the convergence period is below a pre-defined heuristic threshold value, the controller works in a CBR-like mode and when the convergence period is above the pre-defined heuristic threshold value, the controller works in a VBR-like mode. It is important to note that conceptually a real distinction between the two major working modes is not defined, but a continuous and graceful variation from one into the other is defined, thus allowing any hybrid working modes too.

In every working condition, the controller dynamically estimates the number of bits to be allocated to each picture frame depending on its type and complexity in each convergence period and according to a buffer fullness measurement. Thus, ensuring both bit-rate convergence and buffer compliancy of the output bit-stream with the capacity of the receiving device and that of a transmission channel at a receiving side.

Use of convergence period for mode selection makes the controller independent of the prior knowledge of GOP structures for transcoding the input bit-stream into the transcoded output bit-stream. In other words, the controller does not need to know in advance the exact GOP structure, but it works on a picture-by-picture basis, cumulating the statistics about the already processed picture frames and adjusting its assumptions at run-time. Due to this strong constraint, imposed by construction, the controller can be classified as a low-delay controller, thus allowing a very low implementation cost, both in terms of low computational complexity and low system requirements such as minimized memory and communication bandwidth requirements.

Additionally, the convergence period is different from the concept of Group of Pictures (GOP), which is defined in terms of number of frames per second. Generally, the GOP structure always starts with an I-picture frame and further includes a P-picture frame and B-picture frames. Moreover, there cannot be more than one I-picture frame in one frame length, constituting the GOP structure. On the other hand, the convergence period specifies the frame length. For example, the frame length, in other words, the convergence period, can be half the length of the GOP structure. Thus, unlike traditional GOP structures, the frame length corresponding to the convergence period can have more than one I-picture frames or no picture frames at all.

Devices that can implement the disclosed controller include, but are not limited to, set-top boxes, computing devices, digital televisions, mobile phones, laptops, personal digital assistants (PDAs), personal video recorders and in general, any video system with transcoding capabilities (for either storage, streaming or place shift). These devices can be employed in a variety of applications such as streaming, conferencing, surveillance, recording and storing of digital audio/video content, etc.

Figure 1B:
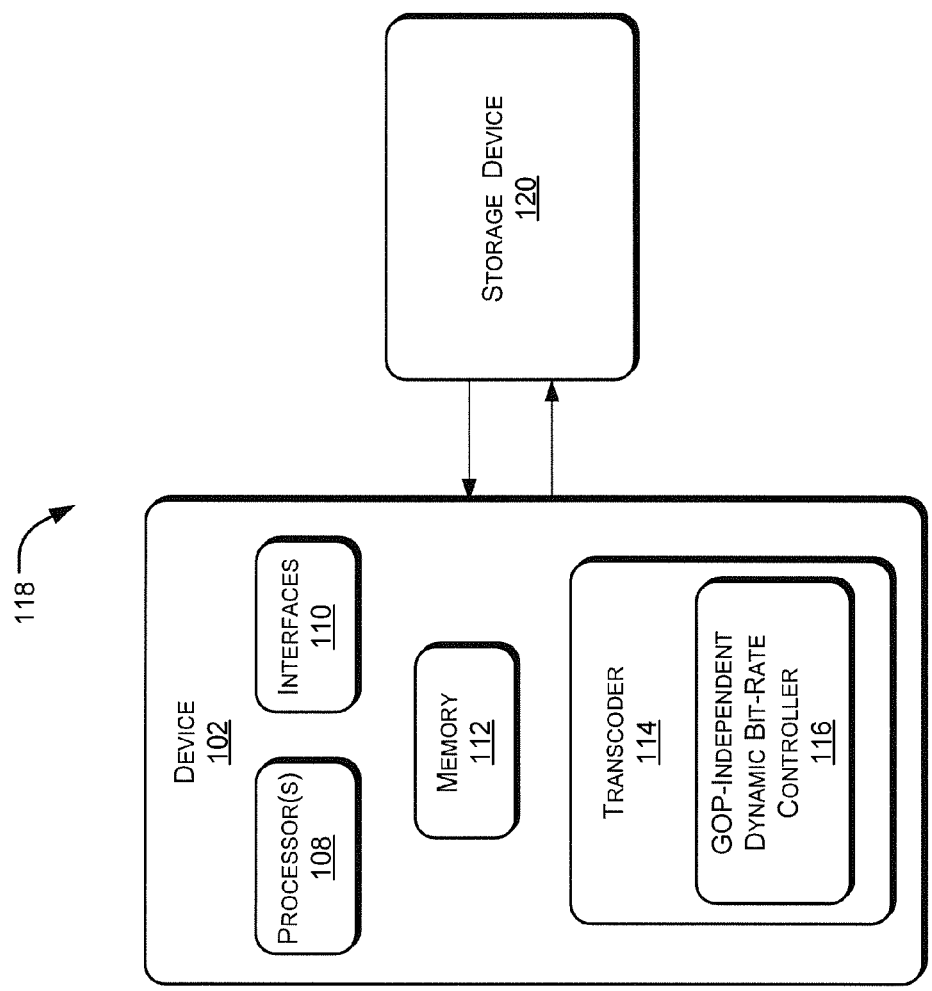

FIG. 1 illustrates an exemplary system 100 implementing a transcoder with a GOP-independent dynamic bit-rate controller (GI-DBRC). In an implementation, the system 100 includes a device 102 and a variety of receiving devices, such as a personal digital assistant 104-1, a mobile phone 104-2, a laptop 104-3, and a television 104-4, hereinafter referred to as receiving devices 104. The device 102 and the receiving devices 104 can communicate via a network 106. The network 106 may be a wireless or a wired network, or a combination thereof. The network 106 may include individual networks interconnected with each other and functioning as a single large network, e.g., the Internet or an intranet. The network 106 may be a dedicated one or a shared one, i.e., provided and maintained by a single service provider or by a number of service providers. Examples of the network 106 include, but are not limited to, Local Area Network (LAN), Wide Area Network (WAN), and so on.

The device 102 can be a set-top box, a base station transceiver system, a personal video recorder, or any other video system with transcoding and/or place shift capabilities. The device 102 can include one or more processor(s) 108, one or more interfaces 110, a memory 112, and a transcoder 114.

Further, the processor(s) 108 may include, for example, microprocessors, microcomputers, microcontrollers, digital signal processors, central processing units, state machines, logic circuitries, and/or any devices that manipulate signals based on operational instructions. Among other capabilities, the processor(s) 108 are configured to fetch and execute instructions stored in the memory 112.

The interface(s) 110 may include a variety of software and hardware interfaces, for example, network interfaces like a radio transceiver circuit, user interfaces such as input/output systems, application-programming interfaces (APIs) like an internal equipment clock, a calendar etc., or a combination of many such interfaces. The interface(s) 110 facilitate user interaction with the device 102, and the device 102 interaction with the receiving devices 104 over the network 106.

The memory 112 may include any computer-readable medium known in the art including, for example volatile memory, e.g., SRAMs and DRAMs and/or non-volatile memory, for e.g., EPROMs, flash memories, etc.

In one implementation, the transcoder 114 converts a pre-compressed input bit-stream encoded in a format, for example, MPEG2, AVI, from a main encoder (not shown in the diagram) into an output bit-stream having a different format, for example, H.264, WMA, etc. and/or a different bit-rate than that of the input bit-stream. It should be noted that the main encoder receives an input bit stream from a variety of sources such as a satellite or a broadcasting station server (not shown in the diagram).

The transcoder 114 further includes a GOP-independent dynamic bit-rate controller 116, interchangeably referred to as controller 116 or bit-rate controller 116 hereinafter. The controller 116 includes two principal operating modes, namely, constant bit-rate (CBR) mode and variable bit-rate (VBR) mode. For this, the controller 116 includes a CBR-oriented module (not shown in this figure) and a VBR-oriented module (not shown in this figure). The CBR-oriented module and the VBR-oriented module are hereinafter referred to as the CBR module and the VBR module respectively. The controller 116 selects the CBR module to facilitate generation of an output bit-stream at a constant bit-rate or the VBR module to facilitate generation of an output bit-stream at variable bit-rate. The transcoded output bit-stream having the target bit-rate is also buffer compliant. The controller 116 verifies the transcoded output bit-stream to avoid any output buffer overflow and underflow conditions. After successful verification, the transcoder 114 sends the transcoded output bit-stream to the receiving devices 104 via the network 106.

FIG. 1 (b) illustrates another exemplary system 118 implementing a transcoder 114 with the controller 116. In another implementation, the system 118 includes the device 102 and a storage device 120. The device 102 further includes a transcoder 114 and the controller 116. The device 102 has already been discussed in detail in FIG. 1(a).

The storage device 120 can be a compact disc (CD), a digital video disc (DVD), a hard disk drive (HDD), typically used in the VBR mode as a storage medium in applications such as personal video recorder (PVR), portable media players, etc. In operation, a video sequence stored in the storage device 120 is accessed by the device 102. The transcoder within the device 102 transcodes the video sequence and sends it to another receiving device that accepts a transcoded output video bit-stream. Thus, enabling video playback from the storage device 120. In a similar fashion, a transcoded bit-stream can be recorded onto the storage device 120.

FIG. 2 illustrates an exemplary block diagram 200 of the transcoder 114. It is to be noted that the controller 116 can be plugged into any transcoder implementation, from full-decode-full-encode to open-loop, passing through any closed loop implementation. The block diagram 200 depicted herein has to be considered as an example for a better comprehension of the system, without any lack of generality. The transcoder 114 includes a decoder 202, hereinafter referred to as Tdecoder 202, an encoder 204, hereinafter referred to as Tencoder 204, and the controller 116. The transcoder 114 is typically placed between a main encoder (not shown in the figure) and a main decoder (not shown in the figure). The main encoder encodes and compresses any input video sequence to provide a pre-compressed input bit-stream 206 in a first video coding format, bit-rate, and/or resolution whereas the main decoder decompresses a compressed output bit-stream 210 at the receiving devices 104. In between the main encoder and the main decoder, the pre-compressed input bit-stream 206 from the main encoder is decoded by the Tdecoder 202. A decoded bit-stream, hereinafter referred to as an input bit-stream 208, is then re-encoded by the Tencoder 204 to provide the compressed output bit-stream 210, hereinafter referred to as output bit-stream 210, encoded in a second video coding format at a target bit-rate. In an implementation, the target bit-rate can be specified by a user. The specified target bit-rate can provide optimized and reliable results if the target bit-rate is specified taking into consideration few factors. These factors include capacity of the receiving devices 104, complexity of the input video sequence, and the available bandwidth of the network 106. The controller 116, included in the transcoder 114, estimates a value of the number of bits to be allocated to every picture frame, hereinafter referred to as a bit-estimate. Based on the bit-estimate and buffer fullness measure, the controller 116 controls generated bit-rate by regulating a quantization step size ($Q_{STEP}$) by determining a corresponding quantization parameter (QP). This value of QP when applied on the input bit-stream 208 by the Tencoder 204 generates an output bit-stream 210 at a rate that corresponds to the target bit-rate. For example, the QP and $Q_{STEP}$ in H.264/AVC coding format are typically related to each other through the below mentioned equation:

$$Q_{STEP} = 2^{\left(\frac{QP-4}{6}\right)} \quad (1)$$

Based on equation (1), there is an increase in $Q_{STEP}$ by twelve percent for each increase in the QP, so that each increment of six in the QP doubles the $Q_{STEP}$. Further, the $Q_{STEP}$ is almost inversely proportional to the number of bits generated by the controller 116. Thus if the generated bits per second, or bit-rate, is high, a lower step size is used by the controller 116, and vice versa. Therefore, a higher bit-rate results in better visual quality, whereas a lower bit-rate results in a degraded visual quality. Thus, tuning of the bits-distribution or bit-estimate gives the user a choice between better picture quality and bits-saving. Depending on the application and user requirement, the value of bit-estimate and hence, $Q_{STEP}$ needs to be appropriately selected. In an embodiment, the controller 116 dynamically provides a value of bit-estimate based on a parameter called as convergence period, discussed later. The convergence period is not dependent on the prior knowledge of GOP structures of the input bit-stream 208 as is the case in the conventional solution. Hence, the controller 116 provides the output bit-stream 210 at the bit-rate as close as possible to the target bit-rate. The controller 116 is a single pass bit-rate controller, i.e., encoding process is performed once per picture frame by the Tencoder 204.

The controller 116 also automatically performs buffer compliancy checks of the output bit-stream(s) 210, to avoid buffer under/overflow. For a better readability, and without lack of generality, the aforementioned step is indicated here and in the following as a separate independent compliance module 212, even if the compliance module 212 is actually implemented within a CBR module (not shown in the figure) and a VBR module (not shown in the figure). The compliance module 212 works differently for the two principal modes of operation in the controller 116, namely constant bit-rate mode and variable bit-rate mode, controlling specific parameters that are more suitable to the two principal operating modes, allowing a better and finer control, together with a better output quality. For the constant bit-rate mode, the verification involves modification of the $Q_{STEP}$ such that buffer fullness is maintained at the main decoder. Based on modification of the $Q_{STEP}$, the QP that was calculated using the bit-estimate is also adjusted accordingly. Thus, both bit-rate convergence and buffer compliancy are ensured in the constant bit-rate mode.

For the variable bit-rate mode, the determining factor to ensure compliancy is arrival and removal timing parameters of a picture frame in the buffer. By controlling the timing parameters, compliancy is ensured without the need of bit-stuffing and frame-skipping. In this way, the bit-stream generated by the transcoder 114 is always compliant with the buffer constraints of various coding standards such as H.264, MPEG 4, etc.

Figure 3:
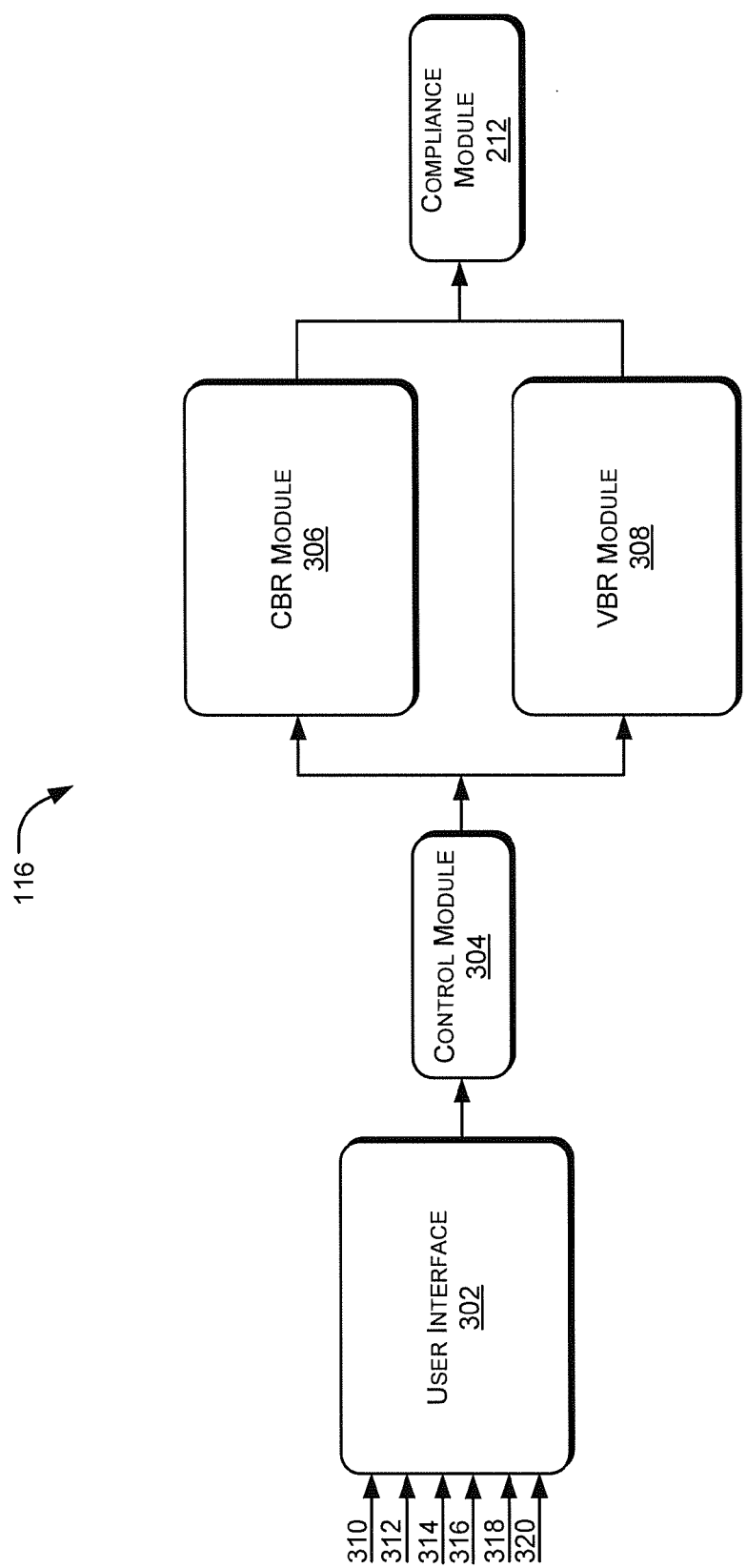
FIG. 3 illustrates an exemplary GI-DBRC in accordance with an embodiment of the present subject matter.

FIG. 3 illustrates an exemplary GOP-independent dynamic bit-rate controller (GI-DBRC) 116 for the transcoder 114 according to an embodiment of the present subject matter. The controller 116 includes a plurality of components, for example, user interface 302, a control module 304, a CBR module 306, a VBR module 308, and a compliance module 212. These components facilitate transcoding of an input bit-stream, for example, the pre-compressed input bit-stream 206 having a particular bit-rate into the output bit-stream 210 of another bit-rate based on the network 106 and the operating or input parameters set by the user.

In an implementation, the controller 116 receives a variety of input parameters, such as, a target bit-rate 310, a maximum instantaneous bit-rate 312, a minimum instantaneous bit-rate 314, a maximum quality 316, a minimum quality 318, and a reaction speed 320, as inputs through the user interface 302. For example, these inputs can be specified by a user through an application programming interface (API). The target bit-rate 310 is the value of target bit-rate requested by the user. The maximum quality 316 and the minimum quality 318 determine the quantization parameter (QP). The concept of QP has already been discussed in FIG. 2. Every video coding standard allows a range of the QP values from which the user can select a particular value. For example, transcoding of a given video coding standard into the H.263/H.264 video coding standard, the range of values for maximum and minimum values of quantization parameter is from zero to fifty one. In another example, for MPEG2/MPEG4, the maximum and minimum values of quantization parameter is in the range of one and thirty-one. Hereinafter, H.264 has been used as an example in the explanation, since the allowed QP range of H.264 video coding standard is higher as compared to that of MPEG2 or MPEG4 video coding standard. This allowed QP range includes QP ranges of most of the popular video coding standards, for example MPEG2/MPEG4.

The controller 116 is, thus, made generic enough to cater to transcoders operating on different standards. Further, the reaction speed 320 is a parameter that defines the time after which the controller 116 guarantees the convergence of the bit-rate of the input bit-stream 208 to the user requested target bit-rate 310. In an implementation, the reaction speed 320 is used to calculate a parameter called convergence period. Convergence period is defined as time expressed in terms of number of frames, referred to as convergence frame number, and can be calculated from the product of reaction speed 320, in milliseconds, and number of frames per second, or frame rate, as mentioned below:

$$ConvergencePeriod = \frac{ReactionSpeed \times FrameRate}{1000} \quad (2)$$

The convergence period is different from the concept of Group of Pictures (GOP), which is defined in terms of number of frames per second. Generally, the GOP structure always starts with an I-picture frame and further includes a P-picture frame and B-picture frames. Moreover, there cannot be more than one I-picture frame in one frame length, constituting the GOP structure. On the other hand, the convergence period specifies the frame length. For example, the frame length, in other words, the convergence period, can be half the length of the GOP structure. Thus, unlike traditional GOP structures, the frame length corresponding to the convergence period can have more than one I-picture frames or no picture frames at all.

In operation, depending on the calculated value of convergence period, the control module 304, included in the controller 116, selects the output behavior from a pure constant bit-rate (CBR) mode to a pure variable bit-rate (VBR) mode. The pure CBR mode facilitates the output bit-stream generation at a constant bit-rate whereas the pure VBR mode facilitates the output bit-stream at a constant quality, thus allowing bigger variations in the instantaneous bit-rate. Based upon the bit-rate obtained from the selected mode, a quantization parameter (QP) is generated by the controller 116 to achieve the target bit-rate, as specified by the user.

For said implementation, when the convergence period is below a pre-defined heuristic threshold value, the controller 116 works in a CBR-like mode and when the convergence period is above the pre-defined heuristic threshold value, the controller 116 works in a VBR-like mode. It is important to note that conceptually a real distinction between the two major working modes is not defined, but a continuous and graceful variation from one onto the other, thus allowing any additional hybrid working modes too. In general, due to a shorter convergence period, the working mode approaches a pure CBR mode and the allowed variance of the instantaneous bit rate is smaller, thus allowing a very fine bit-rate control, for example, in the case of streaming a video over a fixed bandwidth channel. Similarly, due to a longer convergence period the working mode approaches a pure VBR mode and the allowed instantaneous bit rate variation is bigger to achieve a constant output picture quality as much as possible, for example, in the case of a video sequence stored on a DVD or HDD.

In every working mode, the controller 116 dynamically estimates the number of bits to be allocated to each picture frame depending on its type and complexity in each convergence period to achieve the target bit-rate of the output bit-stream thus ensuring bit-rate convergence. At the same time, number of bits to be allocated is also modified according to the buffer fullness measurement. This measurement is performed to ensure compliancy of the output bit-stream with the capacity of the receiving device and that of a transmission channel at a receiving side to accommodate the output bit-stream transcoded at a generated bit-rate. In this way, the overflow and underflow conditions of the receiving device for a particular bit-rate of the output bit-stream are verified.

Use of convergence period for mode selection makes the controller 116 independent of the prior knowledge of GOP structures for transcoding the input bit-stream into the transcoded output bit-stream. In other words, the controller 116 does not need to know in advance the exact GOP structure, but it works on a picture-by-picture basis, cumulating the statistics about the already processed picture frames and adjusting its assumptions at run-time.

As stated, when the convergence period is below a pre-defined heuristic threshold value, for example sixty, the control unit 304 sends an input bit-stream, for example, the input bit-stream 208, to the CBR module 306. As a result, the controller 116 facilitates generation of an output bit-stream, for example, the output bit-stream 210, at a constant bit-rate.

On the other hand, when the convergence period is more than the pre-defined heuristic threshold value, the control unit 304 sends the input bit-stream 208 to the VBR module 308. As a result, the controller 116 facilitates generation of an output bit-stream, for example the output bit-stream 210, at a variable bit-rate.

If the reaction speed is such that the convergence period is less than a pre-defined heuristic threshold value, the controller 116 processes the input bit-stream 208 in the CBR module 306. The CBR module 306 provides a bit-estimate which further helps in determining a value of QP. This QP when applied to the input bit-stream by the Tencoder 204 generates a bit-stream at a constant bit-rate into the transmission channel. For complex pictures, the QP is increased by the CBR module 306 whereas for simple pictures, the QP is decreased by the CBR module 306.

In an implementation, to provide a constant bit-rate, the controller 116 keeps the buffer fullness constant at the start of each set of picture frames corresponding to the convergence period specified by the user. In contrast to the controller 116, traditional bit-rate controllers keep the buffer fullness constant at the start of each GOP structure. Therefore, the controller 116 allocates bits based on the convergence period as opposed to the GOP structure. In addition, unlike traditional transcoders, the GOP structure prediction is not required and the quantization parameter only depends on the convergence period that is calculated by the control module 304 using the reaction speed 320 specified by the user.

Moreover, the CBR module 306 operates on a hybrid model of target-bit and buffer based models. In general, the bit-rate controllers that work on a target-bit based model cause the transcoder to spend an established number of bits on every GOP structure. Such spending of bits is regardless of the picture complexity and is performed even when the real need of bits could be different from the target bit-rate. On the other hand, the buffer based approach ensures that the buffer constraints of overflow and underflow are met and the output bit-stream generated by the Tencoder 204 is compliant with the various coding formats such as H.264, MPEG4, etc. In this way, the hybrid model ensures both bit-rate convergence and buffer compliancy.

Based on the hybrid model, the CBR module 306 receives value of target bit-rate from the user interface 302 and provides a value of bit-estimate. This value of bit-estimate is helpful in calculating the quantization parameter step size ($Q_{STEP}$). The value of $Q_{STEP}$ further provides a value of quantization parameter (QP) which is applied on the input bit-stream 208 by the Tencoder 204 to provide an output bit-stream 210. As discussed earlier in the explanation of FIG. 2, the $Q_{STEP}$ relationship with the QP is differently defined for each coding standard. Therefore, to generate a best-fit QP, the most efficient bit-estimate needs to be provided by the controller 116. In an implementation, the hybrid model is motivated by the theory of efficient estimation and statistical efficiency to provide a bit-estimate that converges to the user defined target bit-rate.

To understand the effectiveness of the hybrid model, three cases can be discussed. The best case would occur if the convergence period coincides with an actual input GOP structure and, where there is a single I-picture frame in one convergence period, thus ensuring a visual quality that matches with the quality of input video sequence.

A second case is one in which the convergence period is different than an input GOP-length and has both intra picture frames, for example, I picture frames, and non-intra picture frames such as P and B picture frames. Since different number of bits are required for I, P, and B picture frames for almost same visual quality, thus varying the number of I-picture frames, without any prior knowledge of the GOP structure, would have a stronger impact on the average number of bits allocated to the I, P and B picture frames. A third case refers to a worst case when all the picture frames can be I picture frames within one convergence period.

In order to provide an efficient estimate for the second case i.e. allocating bits to I and P-picture frames, the following methodology can be used. The convergence period can be defined in terms of the convergence frame number. Let the convergence frame number be denoted as 'f'. The total number of allocated bits (R) to 'f' pictures can be represented as:

$$R = \left(\frac{BitRate}{FrameRate}\right) \times f \quad (3)$$

Further, let $n_I$ and $n_P$ be the number of I and P pictures and $r_I$ and $r_P$ be the number of bits of I and P-picture frames within one convergence period:

$$f = n_I + n_P \quad (4)$$

Assuming that the number of bits allocated to the P-picture frames is half the number of bits allocated to I-pictures and the number of bits allocated to B-pictures is one fourth the number of bits for I-pictures:
Thus, $$r_I = 2(r_P) \quad (5)$$

$$R = (n_I \times r_I) + (n_P \times r_P) \quad (6)$$

Using equations (4) and (5) in equation (6) and solving for $r_I$ and $r_P$, the number of bits allocated to I picture frames can be represented as:

$$r_I = \frac{2R}{f + n_I} \quad (7)$$

Similarly, the number of bits allocated to P picture frames can be represented as:

$$r_P = \frac{2R}{f + n_P} \quad (8)$$

Now, motivated by the theory of efficient estimation, a series of simulations are performed. Simulation results and calculations provide a solution which is proven to give a bit-estimate that has very low variance from the target bit-rate. For example, samples mean is the efficient estimate of the mean of a Gaussian distribution with a known standard deviation. Using the aforementioned method, the mean of the bit-distribution for each picture is estimated. This distribution may not be Gaussian, so the estimate is not strictly efficient. Still, the bit-estimate has been experimentally and mathematically proven to have relatively high statistical efficiency and low variance.

Considering the actual number of bits allocated to a picture frame to be Q, an unbiased bit-estimate, also referred to as $Q_{est}$, of the Q, is said to be an efficient estimate for a class D of distribution functions if, for every distribution function f(u,Q) of class D, the variance or squared error $D^2(Q_{est})$ has reached the minimal value, which is given by the following expression:

$$D^2(Q_{est}) = E[(Q - Q_{est})^2] \geq \frac{1}{n \int_{-\infty}^{+\infty} \left[\frac{\partial \log f(u,Q)}{\partial Q}\right]^2 \cdot f(u, Q) du} \quad (9)$$

The right hand side of expression (9) is called the Cramer-Rao Bound while the left hand of the expression (9) is the variance between $Q_{est}$ and Q. The expression (9) indicates that an efficient estimate of Q is one that has the least variance from the actual Q, and the variance of the estimate is bounded to its lower limit by the Cramer-Rao bound. It should be noted that the distribution function i.e. f (u,Q) may or may not be Gaussian.

Based on the above theory of efficient estimation, a solution is obtained for bit-estimate such that:

$$g(f, i) = \frac{(f - i)}{(f(f + i + 1))} \quad (10)$$

where 'g' is a function of convergence frame number 'f' and index of I-picture frames 'i' of the current convergence period. When bits are allocated based on the form of the function 'g', the variance will be minimum. Therefore, in general, the number of bits adaptively allocated to the $i^{th}$ I-picture:

$$r_{Ii} = 2R \times \{g(f,i)\} \quad (11)$$

R is the total number of allocated bits to all I, P and B-pictures within a convergence period and can be calculated using equation (6). The number of bits for the $j^{th}$ I-picture should be less than $i^{th}$ I-picture within the convergence period 'f', for i<j. It should be noted that a similar methodology can be applied to a case in which the convergence period has both I, P an B picture frames.

The last and the worst case would be when all the picture frames are I-picture frames within one convergence period. The total number of bits 'T' allocated to the pictures of the convergence period is then given by the expression:

$$T = 2Rg(f,0) + 2Rg(f,1) + \ldots + 2Rg(f,f-1) \quad (12)$$

where,
R is the total number of allocated bits to all I, P and B-picture frames within a convergence period and can be calculated using equation (6);
f is the convergence frame number corresponding to the user defined convergence period and reaction speed;
g(f,i) is a function of the convergence frame number 'f' and the number of I-pictures within the convergence period;
T/f is the average number of bits allocated to all I-picture frames.

In the present worst-case scenario of allocating bits to I-picture frames only, the average number of bits in the constant bit-rate mode should approach the target average bit-rate allocated to all I-pictures i.e. T/f.

Therefore, dividing equation (12) by f the expression for average number of bits in the CBR mode(X) is:

$$X = \frac{T}{f} \quad (13)$$

$$X = \frac{2Rg(f, 0) + 2Rg(f, 1) + \ldots + 2Rg(f, f-1)}{f} \quad (14)$$

$$X = 2R(Y) \quad (15)$$

where $$Y = \frac{g(f, 0) + g(f, 1) + \ldots + g(f, f-1)}{f} \quad (16)$$

For non-Gaussian distribution functions, the bit-estimate is not always efficient. However, the bit-estimate still has a high statistical efficiency and a low error variance. Theoretically and experimentally, as Y is also approximately equal to 0.5 for all values of convergence frame number less than sixty, the estimated bit-rate was found very close to the actual bit-rate. At experimental level, the percentage of deviation from the target bit-rate is not more than negative three percent for a maximum of sixty frames per second. Even in the worst case, although the deviation is negative, no information is lost in the transmission channel.

As mentioned earlier, the generated bit-rate is always bound by the target bit-rate. However, the allocated number of bits to a sequence would be more since the buffer constraints have to be met and that requires operations such as bit-stuffing and/or frame skipping. But by using the hybrid model, the $Q_{est}$ is closer to the Q value that can generate the calculated number of bits for each type and index of picture frame. The application of hybrid model also preserves the desired general ratio of the allocated bits to I, P and B-picture frames without the need of bit-stuffing or frame-skipping for overflow and underflow avoidance respectively. Additionally, a buffer compliancy check is automatically performed to avoid buffer underflow/overflow by the compliance module 212 embedded in the controller 116. To ensure that the buffer fullness is maintained at all times, the QP is adjusted in such a way that subsequent picture frames receive more or less number of bits if the allocation of bits in the current picture frame is leading towards an overflow or underflow condition. According to the buffer constraints, the quantization parameter step size ($Q_{STEP}$) is modified from a value that was calculated based on bit-estimate. In general, more the value of $Q_{STEP}$, less would be the chances of the buffer to underflow. In this way, the output bit-stream 210 from the CBR module 306 meets the criteria of bit-rate convergence as well as buffer compliancy.

Additionally, two modes of operation are supported in controller 116 within the CBR module 306. A compile time switch (CTS) is defined to select between the two modes. If the CTS is defined, the CBR module 306 gives more emphasis to the linearity of the buffer fullness and the quality is compromised. On the other hand, if CTS is not defined, then the quality is considered more important and the exact buffer requirement is compromised and thus satisfying only non-overflow and non-underflow conditions.

Alternatively, if the reaction speed is set to be such that the convergence period is above a pre-defined heuristic threshold value, the controller 116 provides the bit-estimate in the variable bit-rate (VBR) module. The value of bit-estimate further helps in determining a QP such that when this QP is applied to the input bit-stream 208 by the Tencoder 204, it generates an output bit-stream 210 at a variable bit-rate. To comply with the buffer constraints, the controller 116 tries to keep the buffer fullness constant at the start of each set of pictures, where each set of pictures corresponds to the convergence period specified by the user. Similar to the CBR module 306, the convergence period can be calculated using the reaction speed 320, specified by the user, and the frame rate. Thus, since reaction speed 320 is slow, the convergence period is long.

Once the controller 116 selects the VBR module 308, the convergence period no longer remains finite as it only concentrates on the maximum instantaneous bit-rates 312 and minimum instantaneous bit-rates 314 defined by the user and constant QP values and not on the convergence period. In general, the visual quality is related to the QP values whereas complexity of an entire sequence of the GOP is related to the average bit-rate. The VBR module 308 saves the bits for low complexity sequences and re-uses the saved bits for high complexity sequences as and when required. This is done in order to maintain constant visual quality within the target bit-rate. The VBR mode is preferred for off-line applications such as recording and storing of digital audio-video content where it is possible to measure the complexity distribution for all the sequences. Thus, the VBR module 308 keeps the QP uniformly constant and smoothly adapts to the changes of the visual content on a frame-by-frame basis, thus allowing constant quality along various GOPs of a single scene. The VBR module 308 manages bits distribution by using a Bit-Budget curve which measures the error between the target bit-rate and the average bit-rate achieved up until the previous frame. The bit-budget curve can be represented by the following mathematical expression:

$$BitBudget(T) = \int_0^T (TarBitrate - IstBitRate(t))dt \quad (17)$$

where, TarBit-rate and IstBit-rate are respectively the target and instantaneous bit-rates, and T is the time interval. For the first picture frame of a sequence, BitBudget(t) is zero and should ideally be zero for the last frame of the sequence as well. The Bit-budget curve based on a Bit-budget model keeps track of saved or extra consumed bits in order to maintain required bit rate convergence. The Bit-budget curve is measured frame after frame and is divided into a number of zones. For every zone, a dedicated look up table (LUT) is prepared that contains the allowed quantization updates, i.e. is the updates to $QP_{STEP}$. Depending on the slope of the Bit-Budget curve and also on the interval that contains a reference quantizer ($Q_{REF}$), a quantization update ($Q_{UPD}$) is chosen from the LUT of the selected Bits-budget zone and added to the reference quantizer of the previous frame (n−1), to serve as a reference quantizer ($Q_{REF}$) for the next frame (n).

$$Q_{REF}(n) = Q_{REF}(n-1) + Q_{UPD} \quad (18)$$

Further, in applications where variable bit-rate is implemented, for example, storing the digital audio-video content, recording, etc., the average bit-rate is imposed a priori, whereas the minimum recording time depends on the available support and is automatically estimated by the VBR module 308. Thus for a high complexity sequences, the controller 116 holds the QP constant, so the visual quality and the entire storage space to store the digital audio-video content remains constant. On the other hand, if the sequence has low complexity, the controller 116 still keeps the QP constant but the entire storage space is not utilized. Additionally, the maximum instantaneous bit-rate 312 and the minimum instantaneous bit-rate 314 determine the values of the bid-budget lower and upper bounds.

Similar to the CBR module 306, to ensure buffer compliancy of the output bit-stream 210 from the VBR module 308 with the main decoder, the compliance module 212 is implemented. This buffer compliancy check is performed to ensure that the output bit-stream 210 from the transcoder 114 does not exceed the capacity of the main decoder (not shown in the figure). Otherwise, the receiving devices 104 may fail to receive the required picture frames within the time allotted for decoding and for synchronized presentation of the audio or video data streams. Such failure in receiving the data can result in loss of data and inconsistent performance referring to a condition of memory overflow and underflow. The compliance module 212 also calculates values of parameters such as buffer fullness or buffer occupancy, timing parameters, and variable buffer delay at the start of each picture. The values are then transferred to the main decoder to initialize its buffer so as to maintain synchronization while the bit-stream is transferred.

Typically, the compliance module 212 is implemented to ensure that variations in bit-rate of the output bit-streams 210 do not exceed capacity of the buffer set by the buffer size. The buffer overflow condition occurs if more bits are to be placed into the buffer when the buffer is full. The buffer underflow condition occurs if some bits are not available in the buffer when the bits are to be fetched from the buffer for decoding/playback.

In one implementation, a timing model using circular linked lists can be used so that at each final arrival time of any coded picture frame, an instantaneous buffer fullness value in the transcoder 114 can be synchronized with that of the main decoder. In order to match the buffer constraints, the target bit-rate and buffer fullness are set to their maximum values. An initial removal time is then adjusted to a point where the buffer fullness is half of its maximum size. Instead of a simple increment, the removal time is manipulated to avoid buffer overflow or underflow.

In one implementation, the output bit-stream 210 is in H.264 coding format, hereinafter referred to as H.264 output bit-stream 210. Now, to check compliancy of the H.264 compressed bit-streams 210 without bit-stuffing or frame-skipping, the timing parameters are manipulated. The timing parameters are arrival time, i.e., the time when the picture frame will enter a buffer and removal time, i.e., the time when it will be removed from the buffer. In this way, the buffer constraints are satisfied for the H.264 output bit-streams 210. In a similar fashion, the buffer constraints can be checked for MPEG output bit-streams for overflow and underflow conditions. The graphs discussed in subsequent figures exemplify the compliancy check for H.264 output bit-streams 210 at a constant and a variable bit-rate by following the aforementioned compliance module 212.

Figure 4:
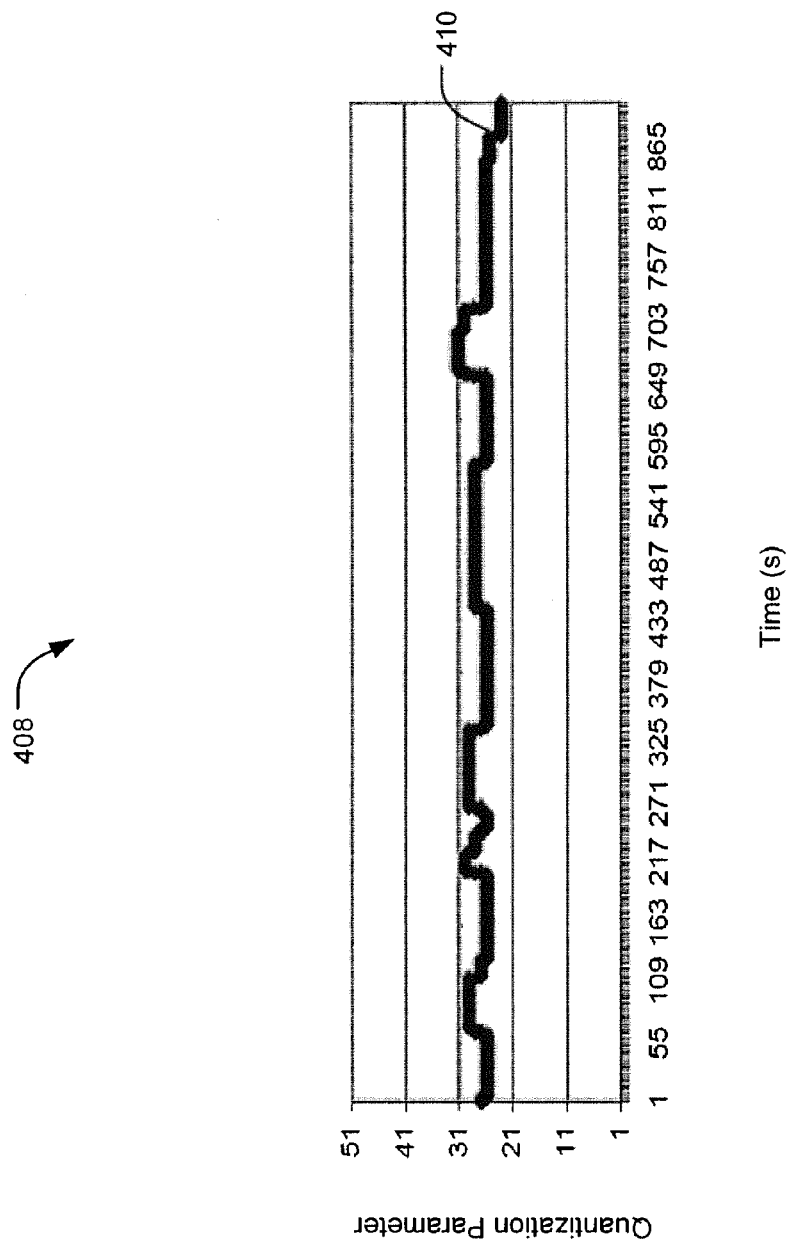
FIG. 4(a) represents a graph representing constant bit-rate (CBR) behavior for the H.264/AVC bit-stream.
FIG. 4(b) illustrates a graph representing variable bit-rate (VBR) behavior for the H.264/AVC bit-stream.

FIG. 4(a) represents a graph 400 representing a H.264 output bit-stream at a constant bit-rate. A number of test sequences such as foreman, flower, akina, films, calendar, etc can be used for validation of the constant bit-rate. These sequences vary in terms of complexity, foreground, background, picture details, etc. Along with the test sequence, during simulation, parameters such as frame rate, the reaction speed 320, convergence frame number, the target bit-rate 310, and actual bit-rate are varied and the target bit-rate deviation is calculated for different sequences at different convergence periods but at a fixed frame rate. The actual bit-rate refers to the bit-rate of the pre-compressed input bit-stream 206.

In one implementation, a calendar sequence can be used for validation of the constant bit-rate. The graph 400 can be obtained for buffer fullness, also referred to as buffer occupancy against time. As shown in the graph 400, generated bit-rate 402 from the transcoder 114 is always within the bounds defined by a buffer size 404. In this way, the buffer constraints are satisfied for H.264 output bit-streams.

FIG. 4(b) represents a graph 408 showing a H.264 output bit-stream at a variable bit-rate. In one implementation, a films sequence can be used and the graph 408 can be plotted against QP values and the number of frames. As shown in the graph 408, QP ranges between twenty and thirty for an average bit-rate 410 of one mega bits per second. For example, the maximum instantaneous bit-rate 312 can be specified fifty percent more than the average bit-rate 410 and the minimum instantaneous bit-rate 314 can be specified thirty percent less than the average bit-rate 410.

Figure 5:
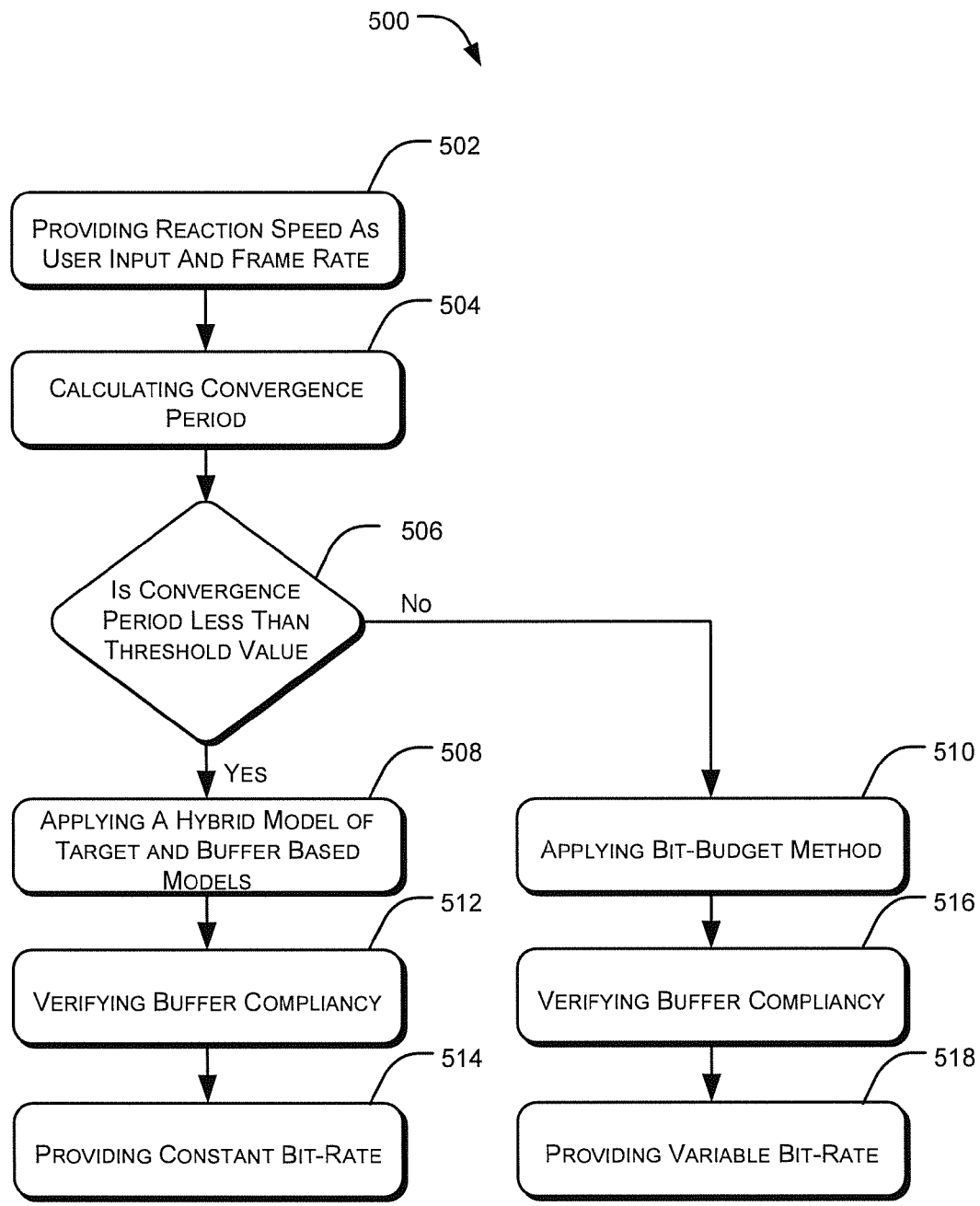
FIG. 5 illustrates an exemplary flow diagram for controlling bit-rate by the GI-DBRC of FIG. 3.

FIG. 5 illustrates an exemplary flow diagram 500 for controlling bit-rate by the controller 116 of FIG. 3. At block 502, the reaction speed 320 is specified by a user and frame rate is also defined. In an implementation, the user specifies various inputs such as the target bit-rate 310, the maximum instantaneous bit-rate 312, the minimum instantaneous bit-rate 314, the maximum quality 316, the minimum quality 318, and the reaction speed 320 via the user interface 302. For example, these inputs can be specified by the user via an application programming interface (API).

At block 504, a convergence period is defined as time expressed in terms of number of frames and is calculated from the product of reaction speed 320 and number of frames per second, i.e., frame rate. The convergence period specifies frame length and is independent of the GOP structure. The frame length may or may not be equivalent to GOP length.

At block 506, the convergence period is measured against a pre-defined heuristic threshold value to select the mode in which the controller 116 should operate. In an implementation, the control unit 304 allows the controller 116 to select between the constant bit-rate (CBR) mode and the variable bit-rate (VBR) mode depending on the convergence period. If the reaction speed is such that the calculated convergence period is below a pre-defined heuristic threshold value, the controller 116 provides the output bit-stream 210 from the transcoder 114 at a constant bit-rate. The control unit 304 sends the input bit-stream 208 to the CBR module 306 and moves to block 508.

On the other hand, if the reaction speed is such that the convergence period is more than the pre-defined heuristic threshold value, then the controller 116 provides the output bit-stream 210 from the transcoder 114 at variable bit-rate. In this case, the control unit 304 sends the input bit-stream 208 to the VBR module 308 and transitions to block 510.

At block 508, the input bit-stream is sent to the CBR module 306 if the convergence period is less than a pre-defined heuristic threshold value. The bit-distribution for the picture frames within the convergence period is based on a hybrid model of target based and buffer-bit based models. If the reaction speed is set such that the convergence period is below the pre-defined heuristic threshold value, the controller 116 processes the input bit-stream 208 in the CBR module 306. In the CBR module 306, the bits are allocated to the various picture frame types at a constant bit-rate. Thus, for complex pictures, the QP is increased whereas for simple pictures the QP is decreased. The CBR module 306 provides a bit-estimate value based on the convergence period as opposed to GOP structure, thus, making the controller 116 truly GOP-independent.

The evaluation of the best bit-estimate is motivated by the method of statistical efficiency and efficient estimation such that for Gaussian and Non-Gaussian distributions, low variance and high statistical efficiency can be obtained. The CBR module 306 distributes the bits to various picture frame types in the convergence period based on the available bandwidth of the transmission channel and pictures frame types. For example, more number of bits can be allocated to the I-picture frames as compared to the P-picture frames. The bit-estimate is used to calculate $Q_{STEP}$ and then QP. The values of QP when applied onto the input bit-stream(s) 208 generate an output bit-stream 210 at a constant bit-rate At block 512, the buffer constraints are verified. The compliance module 212 works differently for the two principal modes of operation in the controller 116, namely constant bit-rate mode and variable bit-rate mode, controlling specific parameters that are more suitable to the two principal operating conditions, allowing a better and finer control, together with a better output quality.

For the constant bit-rate mode, the verification involves modification of the $Q_{STEP}$ such that buffer fullness is maintained. The calculated QP from the bit-estimate is applied to a compliance module 212 to verify compliancy with characteristics of the network 106 and receiving devices 104. For example, for verifying the compliancy of a H.264 output bit-stream 210 with the decoder at the receiver side, overflow and underflow constraints are checked. To avoid overflow and underflow conditions, $Q_{STEP}$ is re-calculated based on the buffer fullness requirements, thus ensuring buffer compliancy along with bit-rate convergence. Accordingly, the QP that was calculated using the bit-estimate is also adjusted. Thus, both bit-rate convergence and buffer compliancy are ensured in the constant bit-rate mode.

At block 514, the bit-stream at a constant bit-rate is obtained. The CBR module 306 generates a re-encoded bit-stream at a constant bit-rate by controlling the value of the bit-estimate based on the inputs received from the user and by using methods of statistical efficiency and efficient estimation. Also, the buffer fullness is ensured at all times.

At block 510, the input bit-stream is sent to the VBR module 308 if the reaction speed 320 is such that the calculated convergence period is more than the pre-defined heuristic threshold value and the bit-budget concept is applied to the input bit-stream 210. If the reaction speed is set to be fast by the user, the controller 116 processes the input sequence in the VBR module 308. In the VBR module 308, the bits are allocated at a variable rate based on the picture frame type and picture complexity. Once the controller 116 selects the VBR module 308, the convergence period no longer remains finite and the VBR module 308 only concentrates on the maximum instantaneous bit-rate 312 and the minimum instantaneous bit-rate 314 defined by the user and not on the convergence period.

The maximum instantaneous bit-rate 312 and the minimum instantaneous bit-rate 314 determine the amount of bid-budget lower and upper bounds respectively. In the VBR mode, the VBR module 308 saves the bits for low complexity sequences and re-uses the saved bits for high complexity sequences, in order to maintain constant visual quality within the target bit-rate. This is referred to as bid-budgeting. The VBR module 308 keeps the QP constant and smoothly adapts to the changes of digital audio-video content on a frame-by-frame basis, thus allowing constant quality along various GOPs of a single scene.

At block 516, the buffer constraints are verified. As described earlier, different techniques are employed by the compliance module 212 to check the buffer compliancy. For the variable bit-rate mode, the determining factor to ensure buffer compliancy is arrival and removal timing parameters of a picture frame in the buffer. By controlling the timing parameters, compliancy is ensured without the need of bit-stuffing and frame-skipping. In this way, the variable bit-rate output bit-stream generated by the transcoder 114 is always compliant with the buffer constraints of various coding standards such as H.264, MPEG 4, etc.

At block 518, a re-encoded bit-stream at a variable bit-rate but constant quality is obtained. The VBR module 308 generates a re-encoded bit-stream at a variable-rate by limiting the values of QP within the maximum instantaneous bit-rate 312 and minimum instantaneous bit-rate 314.

Thus, the controller 116 can be used for selecting between two principal modes, a CBR mode and a VBR mode depending on different operating conditions set by a user and other prevalent operating conditions such as bandwidth of a transmission channel and buffer size. For this, instead of using a prior knowledge of the GOP, the controller 116 uses a parameter called convergence period for providing a target bit-rate. Based on the value of convergence period against a heuristic threshold value, through selection of the CBR mode or the VBR mode, the controller ensures that the generated average bit-rate converges to a target bit-rate within the convergence period. Therefore, the controller 116 is independent of the GOP structure of an input bit-stream. Moreover, the controller 116 can cater to distribution of bits in B-picture frames.

Although embodiments for the GI-DBRC have been described in language specific to structural features and/or methods, it is to be understood that the appended claims are not necessarily limited to the specific features or methods described. Rather, the specific features and methods are disclosed as exemplary implementations for the GI-DBRC.

We claim:

1. A system comprising:
a user interface configured to receive one or more input parameters;
a bit-rate controller configured to regulate a bit-rate of an output bit-stream, the bit-rate controller comprising
a plurality of bit-rate modules configured to determine a quantization parameter based on a bit-estimate,
a control module configured to calculate a convergence period based on the received one or more input parameters and a frame rate, wherein the calculated convergence period corresponds to a number of picture frames to converge the bit-rate of the output bit-stream to a target bit-rate and the control module selects a bit rate module to allocate a number of bits to each different type of picture frame in the calculated convergence period based on the type of each picture frame; and
an encoder configured to encode once per picture frame and for generating the output bit-stream using the quantization parameter determined by the selected bit rate module.

2. The system as claimed in claim 1, wherein the user interface is an application programming interface.

3. The system as claimed in claim 1, wherein the plurality of bit-rate modules comprises a variable bit-rate (VBR) module and a constant bit-rate (CBR) module.

4. The system as claimed in claim 3, wherein the bit-rate module is the CBR module if the calculated convergence period is less than a threshold value.

5. The system as claimed in claim 3, wherein the bit-rate module is the VBR module if the calculated convergence period is more than a threshold value.

6. The system as claimed in claim 1, further comprising a compliance module to check buffer compliancy of the output bit-stream to avoid a condition of an overflow and an underflow of a buffer.

7. The system as claimed in claim 6, wherein the bit-rate controller adjusts the quantization parameter if the output bit-stream is non-compliant.

8. A method comprising:
receiving one or more input parameters;
calculating a convergence period based on the received input parameters and a frame rate, wherein the calculated convergence period corresponds to a number of picture frames to converge a bit-rate of an output bit-stream to a target bit-rate;
selecting a mode of operation to allocate a number of bits to each different type of picture frame in the calculated convergence period based on the type of each picture frame;
estimating a value of bit-estimate based on the selected mode of operation;
performing a buffer compliancy check to avoid a buffer overflow and a buffer underflow;
determining a quantization parameter based on the value of bit-estimate and the buffer compliancy check;
encoding once per picture frame; and
generating the output bit-stream at a regulated bit-rate using the determined quantization parameter.

9. The method as claimed in claim 8, wherein the one or more input parameters are provided using an application programming interface.

10. The method as claimed in claim 8, wherein the mode of operation is at least one of a variable bit-rate (VBR) mode and a constant bit-rate (CBR) mode.

11. The method as claimed in claim 10, wherein the VBR mode is selected if the calculated convergence period is more than a threshold value.

12. The method as claimed in claim 10, wherein the CBR mode is selected if the calculated convergence period is less than a threshold value.

13. The method as claimed in claim 10, wherein the VBR mode comprises ensuring the buffer compliancy of the output bit-stream to avoid the buffer overflow and the buffer underflow by controlling an arrival and a removal time of the picture frame.

14. A non-transitory computer-readable medium having embodied thereon a computer program for executing a method comprising:
receiving one or more input parameters;
calculating a convergence period based on the received one or more input parameters and a frame rate, wherein the calculated convergence period corresponds to a number of picture frames to converge the bit-rate of an output bit-stream to a target bit-rate;
selecting a mode of operation to allocate a number of bits to each different type of picture frame in the calculated convergence period based on the type of each picture frame;
estimating a value of bit-estimate based on the selected mode of operation;
performing a buffer compliancy check to avoid a buffer overflow and a buffer underflow;
determining a quantization parameter based on the value of bit-estimate and the buffer compliancy check;
encoding once per picture frame; and
generating the output bit-stream at a regulated bit-rate using the determined quantization parameter.

15. The non-transitory computer-readable medium as claimed in claim 14, wherein the input parameters are provided using an application programming interface.

16. The non-transitory computer-readable medium as claimed in claim 14, wherein the mode of operation is selected from a group of a variable bit-rate (VBR) mode and constant bit-rate (CBR) mode.

17. The non-transitory computer-readable medium as claimed in claim 16, wherein the VBR mode is selected if the calculated convergence period is more than a threshold value.

18. The non-transitory computer-readable medium as claimed in claim 16, wherein the CBR mode is selected if the calculated convergence period is less than a threshold value.

19. The non-transitory computer-readable medium as claimed in claim 16, wherein the VBR mode comprises ensuring the buffer compliancy of the output bit-stream to avoid the buffer overflow and the buffer underflow by controlling an arrival and a removal time of the picture frame.

20. The non-transitory computer-readable medium as claimed in claim 14 wherein one of the input parameters comprises a maximum instantaneous bit-rate, a minimum instantaneous bit-rate, a minimum quality, a maximum quality, or a target bit-rate.

* * * * *